US005554450A

United States Patent [19]

Shi et al.

[11] Patent Number: 5,554,450

[45] Date of Patent: Sep. 10, 1996

[54] ORGANIC ELECTROLUMINESCENT DEVICES WITH HIGH THERMAL STABILITY

[75] Inventors: Jianmin Shi, Webster; Chin H. Chen, Mendon; Steven A. Van Slyke; Ching W. Tang, both of Rochester, all of N.Y.

[73] Assignee: Eastman Kodak Company, Rochester, N.Y.

[21] Appl. No.: 401,102

[22] Filed: Mar. 8, 1995

[51] Int. Cl.$^6$ .......... B32B 9/00

[52] U.S. Cl. .......... 428/690; 428/457; 428/704; 428/917; 313/506

[58] Field of Search .......... 428/690, 917, 428/457, 689, 704; 313/506, 507; 430/59

[56] References Cited

U.S. PATENT DOCUMENTS

| | | | |
|---|---|---|---|
| 2,733,367 | 1/1956 | Gillson, Jr. | 313/108 |
| 2,941,104 | 6/1960 | Swindells | 313/108 |
| 3,172,862 | 3/1965 | Gurnee et al. | 252/301.3 |
| 3,173,050 | 3/1965 | Gurnee | 313/108 |
| 3,180,730 | 4/1965 | Klupfel et al. | 96/1 |
| 3,567,450 | 3/1971 | Brantly et al. | 96/1.5 |
| 3,658,520 | 4/1972 | Brantly et al. | 96/1.6 |
| 3,710,167 | 1/1973 | Dresner et al. | 313/108 |
| 3,935,031 | 1/1976 | Adler | 136/206 |
| 4,035,686 | 7/1977 | Fleming | 313/503 |
| 4,175,960 | 11/1979 | Berwick et al. | 430/58 |
| 4,356,429 | 10/1982 | Tang | 313/503 |
| 4,539,507 | 9/1985 | VanSlyke et al. | 313/504 |
| 4,720,432 | 1/1988 | VanSlyke et al. | 428/457 |
| 4,885,211 | 12/1989 | Tang et al. | 428/457 |
| 4,923,774 | 5/1990 | Van der Auweraer et al. | 430/59 |
| 4,950,950 | 8/1990 | Perry et al. | 313/504 |
| 5,047,687 | 9/1991 | VanSlyke | 313/503 |
| 5,059,861 | 10/1991 | Littman et al. | 313/503 |
| 5,059,862 | 10/1991 | VanSlyke et al. | 313/503 |
| 5,061,569 | 10/1991 | VanSlyke et al. | 428/457 |
| 5,069,975 | 12/1991 | Nakada et al. | 428/457 |
| 5,073,446 | 12/1991 | Scozzafava et al. | 428/323 |
| 5,104,740 | 4/1992 | Shinkai et al. | 428/457 |
| 5,122,711 | 6/1992 | Wakimoto et al. | 313/504 |
| 5,141,671 | 8/1992 | Bryan et al. | 252/301.16 |
| 5,150,006 | 9/1992 | VanSlyke et al. | 313/504 |
| 5,151,629 | 9/1992 | VanSlyke | 313/504 |
| 5,227,945 | 7/1993 | Croce | 361/105 |
| 5,256,945 | 10/1993 | Imai et al. | 313/504 |
| 5,374,489 | 12/1994 | Imai et al. | 428/690 |

OTHER PUBLICATIONS

Dresner, "Double Injection Electroluminescence in Anthracene", RCA Review, vol. 30, pp. 322–334, 1969.

Research Disclosure, Jul. 1992, No. 339, pp. 571–573; (33964–"Electroluminescent Device and Substances for Use Therein").

JP 07–090256A, Apr. 4, 1995 (with English Language Abstract).

*Primary Examiner*—Patrick Ryan
*Assistant Examiner*—Marie R. Yamnitzky
*Attorney, Agent, or Firm*—Raymond L. Owens

[57] ABSTRACT

An organic electroluminescent device which includes an anode and a cathode, and an organic electroluminescent element disposed between the anode and cathode. The organic electroluminescent element has at least one hole transporting layer. The hole transport layer includes a polyaromatic amine of the formula:

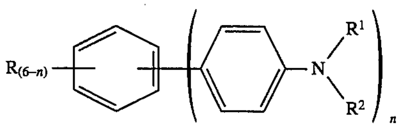

where n is equal to 3, 4, 5, or 6;

$R^1$ is selected from the group consisting of hydrogen, alkyl, aryl and substituted aryl;

$R^2$ is selected from the group consisting of hydrogen, alkyl, aryl and substituted aryl; and R is selected from the group consisting of hydrogen, and alkyl.

5 Claims, 1 Drawing Sheet

ORGANIC ELECTROLUMINESCENT DEVICES WITH HIGH THERMAL STABILITY

FIELD OF THE INVENTION

This invention relates to organic electroluminescent devices. More specifically, this invention relates to devices which emit light from a current conducting organic layer and have high thermal stability.

BACKGROUND OF THE INVENTION

While organic electroluminescent devices have been known for about two decades, their performance limitations have represented a barrier to many desirable applications. (For brevity, EL, the common acronym for electroluminescent, is sometimes substituted.)

Representative of earlier organic EL devices are Gurnee et al U.S. Pat. No. 3,172,862, issued Mar. 9, 1965; Gurnee U.S. Pat. No. 3,173,050, issued Mar. 9, 1965; Dresner, "Double Injection Electroluminescence in Anthracene", RCA Review, Vol. 30, pp. 322–334, 1969; and Dresner U.S. Pat. No. 3,710,167, issued Jan. 9, 1973. The organic emitting material was formed of a conjugated organic host material and a conjugated organic activating agent having condensed benzene rings. Naphthalene, anthracene, phenanthrene, pyrene, benzopyrene, chrysene, picene, carbazole, fluorene, biphenyl, terpheyls, quarterphenyls, triphenylene oxide, dihalobiphenyl, trans-stilbene, and 1,4-diphenylbutadiene were offered as examples of organic host materials. Anthracene, tetracene, and pentacene were named as examples of activating agents. The organic emitting material was present as a single layer having thicknesses above 1 mm.

The most recent discoveries in the art of organic EL device construction have resulted from EL device constructions with the organic luminescent medium consisting of two extremely thin layers (<1.0 mm in combined thickness) separating the anode and cathode, one specifically chosen to inject and transport holes and the other specifically chosen to inject and transport electrons and also acting as the organic luminescent zone of the device. The extremely thin organic luminescent medium offers reduced resistance, permitting higher current densities for a given level of electrical biasing. Since light emission is directly related to current density through the organic luminescent medium, the thin layers coupled with increased charge injection and transport efficiencies have allowed acceptable light emission levels (e.g. brightness levels capable of being visually detected in ambient light) to be achieved with low applied voltages in ranges compatible with integrated circuit drivers, such as field effect transistors.

For example, Tang U.S. Pat. No. 4,356,429 discloses an EL device formed of an organic luminescent medium consisting of a hole injecting and transporting layer containing a porphyrinic compound and an electron injecting and transporting layer also acting as the luminescent zone of the device. In Example 1, an EL device is disclosed formed of a conductive glass transparent anode, a 1000 Angstrom hole injecting and transporting layer of copper phthalocyanine, a 1000 Angstrom electron injecting and transporting layer of tetraphenylbutadiene in poly(styrene) also acting as the luminescent zone of the device, and a silver cathode. The EL device emitted blue light when biased at 20 volts at an average current density in the 30 to 40 mA/cm$^2$ range. The brightness of the device was 5 cd/m$^2$.

A further improvement in such organic EL devices is taught by Van Slyke et al U.S. Pat. No. 4,539,507. Van Slyke et al realized a dramatic improvement in light emission by substituting for the hole injecting and transporting porphyrinic compound of Tang an aromatic tertiary amine layer. Referring to Example 1, onto a transparent conductive glass anode were vacuum vapor deposited successive 750 Angstrom hole injecting and transporting, 1,1-bis (4-di p-tolylaminophenyl)cyclohexane and electron injecting and transporting 4,4'-bis(5,7-di-t-pentyl-2-benzoxazolyl)-stilbene layers, the latter also providing the luminescent zone of the device. Indium was employed as the cathode. The EL device emitting blue-green light (520 nm peak). The maximum brightness achieved 340 cd/m$^2$ at a current density of about 140 mA/cm$^{-2}$ when the applied voltage was 22 volts. The maximum power conversion efficiency was about $1.4\times10^{-3}$ watt/watt, and the maximum EL quantum efficiency was about $1.2\times10^{-2}$ photon/electron when driven at 20 volts.

The organic EL devices have been constructed of a variety of cathode materials. Early investigations employed alkali metals, since these are the lowest work function metals. Other cathode materials taught by the art have been higher work function (4 eV or greater) metals, including combinations of these metals, such as brass, conductive metal oxides (e.g. indium tin oxide), and single low work function (<4 eV) metals. Gurnee et al and Gurnee, cited above, disclosed electrodes formed of chrome, bass, copper and conductive glass. Dresner U.S. Pat. No. 3,710,167 employed a tunnel injection cathode consisting of aluminum or degenerate N$^+$ silicon with a layer of the corresponding aluminum or silicon oxide of less than 10 Angstroms in thickness. Tang, cited above, teaches useful cathodes to be formed from single metals with a low work function, such as indium, silver, tin, and aluminum while Van Slyke et al, cited above, discloses a variety of single metal cathodes, such as indium, silver, tin, lead, magnesium, manganese, and aluminum.

Tang et al, U.S. Pat. No. 4,885,211 discloses an EL device comprised of a cathode formed of a plurality of metals other than alkali metals, at least one of which has a work function of less than 4 eV.

Commonly assigned VanSlyke et al U.S. Pat. No. 4,720,432 described an electroluminescent device using an improved multi-layer organic medium. As set forth in this patent the electroluminescent or EL device can be driven by a direct voltage source or an alternating current (AC) voltage source or any intermittent power source. This EL device is basically a diode rectifier which permits electrical current to flow only in the forward bias voltage. This current excites the organic medium to produce electroluminescence. In reverse bias, the current is blocked from entering the diode and consequently no light emission is produced.

Further improvement in organic electroluminescent devices such as color, stability, efficiency and fabrication methods have been disclosed in U.S. Pat. Nos. 5,151,629; 5,150,006; 5,141,671; 5,073,446; 5,061,569; 5,059,862; 5,059,861; 5,047,687; 4,950,950; 5,104,740; 5,227,252; 5,256,945; 5,069,975, and 5,122,711.

Notwithstanding these improvements, there are still problems with the thermal stability of the EL devices comprising thin layers of vapor-deposited organic films. Thermal instability means that the EL device experiences faster degradation with increasing temperature or fails to function at a certain temperature above the room ambient. The cause of this instability is believed to be the morphological change in the organic layers used in the EL device. Furthermore, the change may initiate from any one of the organic layers, which is likely to be the one with the least thermal stability, to result in a complete device failure. It is clear from the prior art in organic EL that the hole-transporting material based on low-molecular-weight aromatic amines is the least thermally stable, characterized by a glass transition temperature generally below 100° C. Therefore, it is important to further improve the thermal stability of this class of materials with a new design in the molecular structure. The expected advantages is that the EL device can be operated at a higher temperature. With a higher thermal degradation threshold, the EL device can also be driven to a higher brightness level because it is able to sustain a greater current density.

SUMMARY OF THE INVENTION

It is an object of the present invention to provide an organic EL device with improved thermal stability.

This object is achieved in an organic electroluminescent device, comprising an anode and a cathode, and an organic electroluminescent element disposed between the anode and cathode;

characterized in that the organic electroluminescent element has at least one hole transporting layer;

the hole transport layer includes a polyaromatic amine which has a glass transition temperature (Tg) above 100° C. for the hole transporting layer, the polyaromatic amine having a polysubstituted anilino benzenes molecular structure having three or more amine moieties connected in a single molecule.

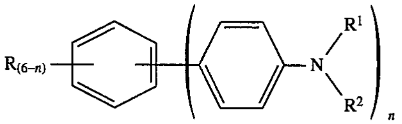

where $R^1$ and $R^2$ are either alkyl, aryl, or substituted aryl;

R is Hydrogen, alkyl, phenyl, or substituted phenyl;

n=3,4,5, or 6.

BRIEF DESCRIPTION OF THE DRAWINGS

These and other advantages of this invention can be better appreciated by reference to the following detailed description considered in conjunction with the drawings in which.

DETAILED DESCRIPTION OF THE PREFERRED EMBODIMENTS

Figure 1:
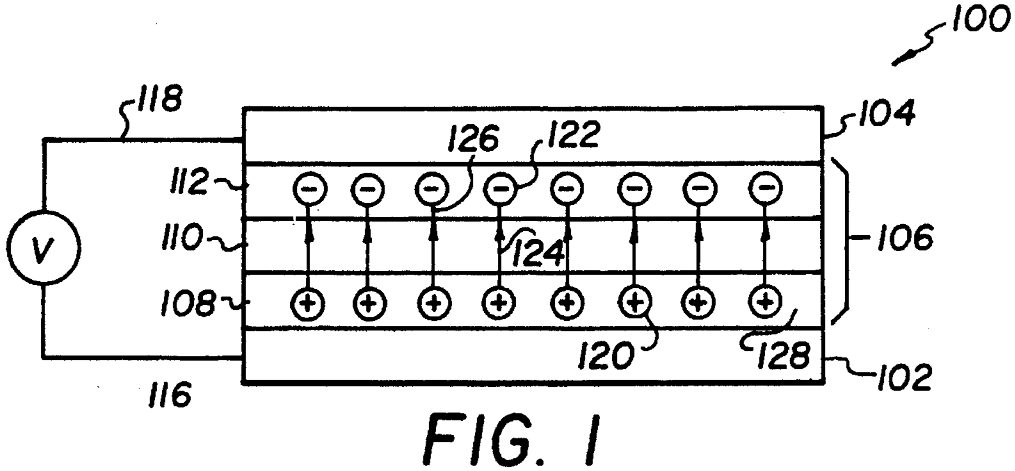
FIGS. 1, 2 and 3 are schematic diagrams of EL devices which can use the present invention.

An electroluminescent or EL device 100 according to the invention is schematically illustrated in FIG. 1. Anode 102 is separated from cathode 104 by an organic luminescent medium 106, which, as shown, consists of three superimposed layers. Layer 108 located on the anode forms a hole injecting zone of the organic luminescent medium. Located above the hole injecting layer is layer 110, which forms a hole transporting zone of the organic luminescent medium. Interposed between the hole transporting layer and the cathode is layer 112, which forms an electron injecting and transporting zone of the organic luminescent medium. The anode and the cathode are connected to an external AC or DC power source 114 by conductors 116 and 118, respectively. The power source can be pulsed or continuous wave (CW).

The EL device can be viewed as a diode which is forward biased when the anode is at a higher potential than the cathode. Under these conditions injection of hole (positive charge carriers) occurs into the lower organic layer, as schematically shown at 120, while electrons are injected into the upper organic layer, as schematically shown at 122, into the luminescent medium. The injected holes and electrons each migrate toward the oppositely charged electrode, as shown by the arrows 124 and 126, respectively. This results in hole-electron recombination. When a migrating electron drops from its conduction potential to a valence band in filing a hole, energy is released as light. Hence the organic luminescent medium forms between the electrodes a luminescence zone receiving mobile charge carriers from each electrode. Depending upon the choice of alternative constructions, the released light can be emitted from the organic luminescent material through one or more edges 128 of the organic luminescent medium separating the electrodes, through the anode, through the cathode, or through any combination of the foregoing.

Since the organic luminescent medium is quite thin, it is usually preferred to emit light through one of the two electrodes. This is achieved by forming the electrodes as a translucent or transparent coating, either on the organic luminescent medium or on a separate translucent or transparent medium or on a separate translucent or transparent support. The thickness of the coating is determined by balancing light transmissions (or extinction) and electrical conductance (or resistance). A practical balance in forming a light transmissive metallic electrode is typically for the conductive coating to be in the thickness range of 50 to 250 Angstroms. Where the electrode is not intended to transmit light or is formed of a transparent material, such as a transparent conductive metal oxide, any greater thickness found convenient in fabrication can also be employed.

Figure 2:
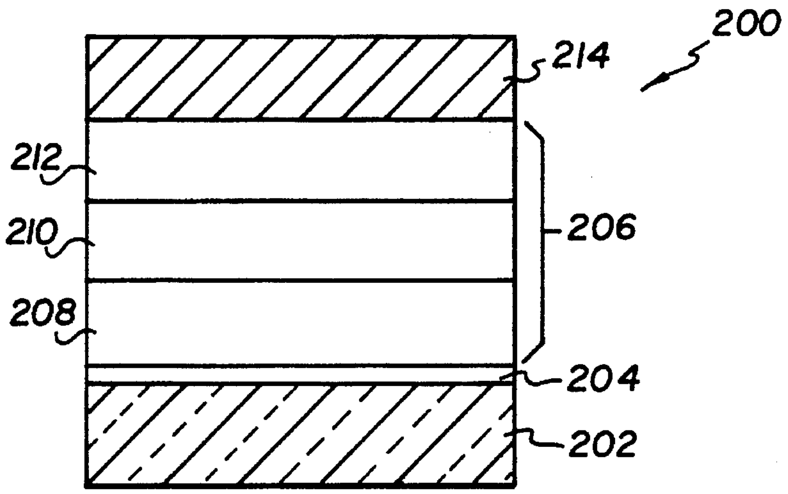

Organic EL device 200 shown in FIG. 2 is illustrative of one preferred embodiment of the invention. Because of the historical development of organic EL devices it is customary to employ a transparent anode. This is achieved by providing a transparent insulative support 202 onto which is deposited a conductive light transmissive relatively high work function metal or metal oxide layer to form anode 204. The organic luminescent medium 206 and therefore each of its layers 208, 210, and 212 correspond to the medium 106 and its layers 108, 110, and 112, respectively, and require no further description. With preferred choices of materials, described below, forming the organic luminescent medium the layer 212 is the zone in which luminescence occurs. The cathode 214 is conveniently formed by deposition on the upper layer of the organic luminescent medium.

Figure 3:
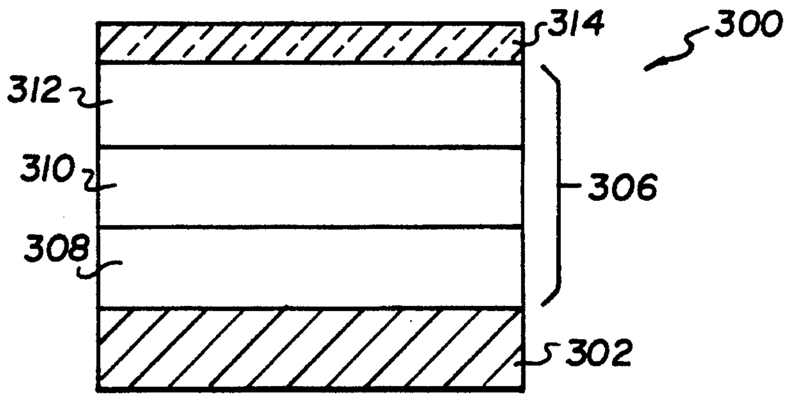

Organic EL device 300, shown in FIG. 3, is illustrative of another preferred embodiment of the invention. Contrary to the historical pattern of organic EL device development, light emission from the device 300 is through the light transmissive (e.g. transparent or substantially transparent) cathode 314. While the anode of the device 300 can be formed identically as the device 200, thereby permitting light emission through both anode and cathode, in the preferred form shown the device 300 employs an opaque charge conducting element forming the anode 302, such as a relatively high work function metallic substrate. The organic luminescent medium 306 and therefore each of its layers 308, 310, and 312 correspond to the medium 106 and layers 108, 110, and 112, respectively and 20 require no further description. The significant difference between devices 200 and 300 is that the latter employs a thin, light transmissive (e.g., transparent or substantially transparent) cathode in place of the opaque cathode customarily included in the organic EL devices, and in most instances, employs an opaque anode instead of the light transmissive anode normally employed.

Viewing organic EL devices 200 and 300 together, it is apparent that the present invention offers the option of mounting the devices on either a positive or negative polarity opaque substrate.

The organic luminescent medium of the EL devices of this invention contains two separate organic layers, one layer forming the electron injecting and transporting zone of the device and one layer forming the hole injecting and transporting zone.

A preferred embodiment of the EL devices of this invention contains a minimum of three separate organic layers, at least one layer forming the electron injecting and transporting zone of the device, and at least two layers forming the hole injecting and transporting zone, one layer of the latter zone providing a hole injecting zone and the remaining layer providing a hole transporting zone.

A layer containing a porphyrinic compound forms the hole injecting zone of the organic EL device. A porphyrinic compound is any compound, natural or synthetic, which is derived from or includes a porphyrin structure, including porphine itself. Any of the prophyrinic compounds disclosed by Adler, U.S. Pat. No. 3,935,031 or Tang U.S. Pat. No. 4,356,429, the disclosures of which are here incorporated by reference, can be employed.

Preferred porphyrinic compounds are those of structural formula

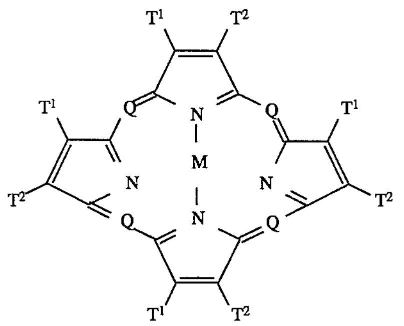

(I)

wherein

Q is—N= or—C(R)=;

M is a metal, metal oxide, or metal halide;

R is hydrogen, alkyl, aralkyl, aryl, or alkaryl; and $T^1$ and $T^2$ represent hydrogen or together complete a unsaturated 6 member ring, which can include substituents, such as alkyl or halogen. Preferred 6 membered rings are those formed of carbon, sulfur, and nitrogen ring atoms. Preferred alkyl moieties contain from about 1 to 6 carbon atoms while phenyl constitutes a preferred aryl moiety.

In an alternative preferred form the porphyrinic compounds differ from those of structural formula (I) by substitution of two hydrogens for the metal atom, as indicated by formula (II):

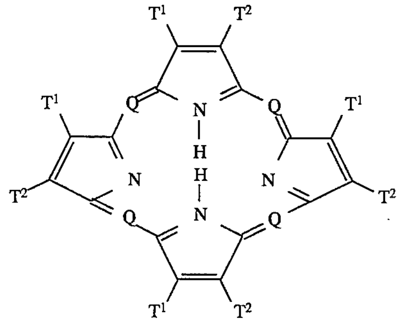

(II)

Highly preferred examples of useful porphyrinic compounds are metal free phthalocyanines and metal containing phthalocyanines. While the porphyrinic compounds in general and the phthalocyanines in particular can contain any metal, the metal preferably has a positive valence of two or higher. Exemplary preferred metals are cobalt, magnesium, zinc, palladium, nickel, and, particularly, copper, lead, and platinum.

Illustrative of useful porphyrinic compounds are the following:

PC-1: Porphine
PC-2: 1,10,15,20-tetraphenyl-21H,23H-porphine copper (II)
PC-3: 1,10,15,20-tetrapheyl-21H,23H-porphine zinc (II)
PC-4: 5,10,15,20-tetrakis(pentafluorophenyl)-21H,23H-porphine
PC-5: Silicon phthalocyanine oxide
PC-6: Aluminum phthalocyanine chloride
PC-7: Phthalocyanine (metal free)
PC-8: Copper tetramethylphthalocyanine
PC-10: Copper phthlocyanine
PC-11: Chromium phthalocyanine fluoride
PC-12: Zinc phthalocyanine
PC-13: Lead phthalocyanine
PC-14: Titanium phthalocyanine oxide
PC-15: Magnesium phthalocyanine
PC-16: Copper octamethylphthalocyanine The hole transporting layer of the organic EL device contains at least one hole transporting aromatic tertiary amine, where the latter is understood to be a compound containing at least one trivalent nitrogen atom that is bonded only to carbon atoms, at least one of which is a member of an aromatic ring. In one form the aromatic tertiary amine can be an arylamine, such as a monarylamine, diarylamine, triarylamine, or a polymeric arylamine. Exemplary monomeric triarylamines are illustrated by Klupfel et al U.S. Pat. No. 3,180,730. Other suitable triarylamines substituted with vinyl or vinyl radicals and/or containing at least one active hydrogen containing group are disclosed by Brantley et al U.S. Pat. Nos. 3,567,450 and 3,658,520.

Another class of aromatic tertiary amines are those which include at least two aromatic tertiary amine moieties. Such compounds include those represented by structural formula (III).

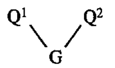

(III)

wherein $Q^1$ and $Q^2$ are independently aromatic tertiary amine moieties and

G is a linking group such as an arylene, cycloalkylene, or alkylene group of a carbon to carbon bond.

A preferred class of triarylamines satisfying structural formula (III) and containing two triarylamine moieties are those satisfying structural formula (IV):

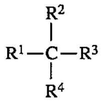

(IV)

where $R^1$ and $R^2$ each independently represents a hydrogen atom, an aryl group, or an alkyl group or $R^1$ and $R^2$ together represent the atoms completing a cycloalkyl group and $R^3$ and $R^4$ each independently represents an aryl group which is in turn substituted with a diaryl substituted amino group, as indicated by structural formula (V):

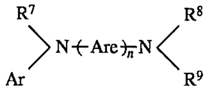

(VI)

wherein $R^5$ $R^6$ are independently selected aryl groups.

Another preferred class of aromatic tertiary amines are tetraaryldiamines. Preferred tetraaryldiamines include two diarylamino groups, such as indicated by formula (V), linked through an arylene group. Preferred tetraarylkdiamines include those represented by formula (VI).

wherein

Are is an arylene group, n is an integer of from 1 to 4, and

Ar, $R^7$, $R^8$, and $R^9$ are independently selected aryl groups.

The various alkyl, alkylene, aryl, and arylene moieties of the foregoing structural formulae (III), (IV), (V), can each in turn be substituted. Typical substituents including alkyl groups, alkoxy groups, aryl groups, aryloxy groups, and halogen such as fluoride, chloride, and bromide. The various alkyl and alkylene moieties typically contain from about 1 to 6 carbon atoms. The cycloalkyl moieties can contain from 3 to about 10 carbon atoms, but typically contain five, six, or seven ring carbon atoms—e.g., cyclopentyl, cyclohexyl, and cycloheptyl ring structures. The aryl and arylene moieties are preferably phenyl and phenylene moieties.

While the entire hole transporting layer of the organic electroluminesce medium can be formed of a single aromatic tertiary armine, it is a further recognition of this invention that increase stability can be realized by employing a combination of aromatic tertiary amines. Specifically, as demonstrated in the examples below, it has been observed that employing a triarylamine, such as a triarylamine satisfying the formula (IV), in combination with a tetraaryldiamine, such as indicated by formula (VI), can be advantageous. When a triarylamine is employed in combination with a tetraaryldiamine, the latter is positioned as a layer interposed between the triarylamine and the electron injecting and transporting layer.

Representative useful aromatic tertiary amines are disclosed by Berwick et al U.S. Pat. No. 4,175,960 and Van Slyke et al U.S. Pat. No. 4,539,507, here incorporated by reference. Berwick et al in addition discloses as useful hole transporting compounds N substituted carbazoles, which can be viewed as ring bridged variants of the diaryl and triarylamines disclosed above. Illustrative of useful aromatic tertiary amines are the following:

1,1-Bis(4-di-p-tolylaminophenyl)cyclohexane 1,1-Bis(4-di-p-tolylaminophenyl)-4-phenylcyclohexane 4,4'-Bis(diphenylamino)quadriphenyl Bis(4-dimethylamino-2-methylphenyl)-phenylmethane N,N,N-Tri(p-tolyl)amine 4-(di-p-tolylamino)-4'-[4(di-p-tolylamino)-styryl]stilbene N,N,N',N'-Tetra-p-tolyl-4-4'-diaminobiphenyl N,N,N',N'-Tetraphenyl-4,4'-diaminobiphenyl N-Phenylcarbazole Poly(N-vinylcarbazole)

An important aspect that affects the performance of the organic EL devices is the morphological stability of the organic thin film layers. The transition of an organic thin film from an amorphous state to a crystalline or semicrystalline state, or from one crystaline state to another crystaline state, can result in a physical or morphological change in the thin film. This transition is generally dependent on temperature. The transition temperature from an amorphous state to a crystalline state is known as the glass transition temperature, Tg. The integrity of the organic EL devices described in this invention is sensitive to this morphological change because the electron and hole transport characteristics and their recombination efficiency which results in electroluminescence are highly dependent on the microscopic structures of the organic layers. For instance, if the EL efficiency decreases as a result of a gradual morphological change, the electroluminescence output would also decrease steadily limiting the usefulness of the EL device. In a more severe instance, the device may fail catastrophically due to the disruption of the organic layers in the EL structure and the formation of electrical shorts between the anode and cathode conductors. Thus, it is recognized that all the organic layers forming the EL device should, in principle, have as high a glass transition temperature as possible and the individual layer that has the lowest Tg is likely the one that would limit the overall stability of the EL device. Specifically, it is realized that the amines used in the hole transporting layer, as described above, forms the least stable component in the EL structure because of the low Tg, i.e. less than 100° C., generally associated with this class of materials. The molecular formula of a few of the commonly used aromatic amines in EL devices, together with their Tg, are listed as follows:

| Molecular Structure | Tg(°C.) |
|---|---|
| 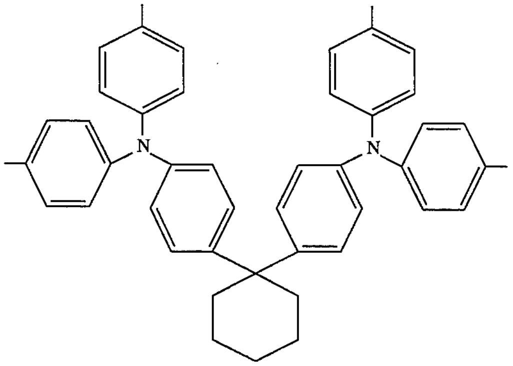 | 78 |
| 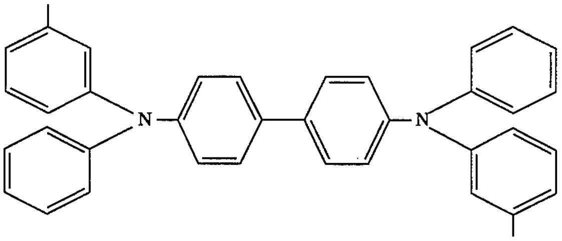 | 60 |
| 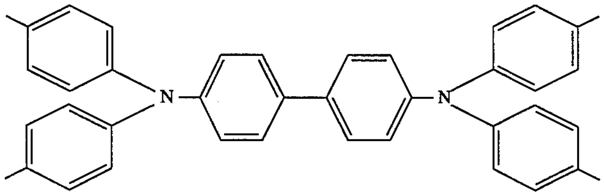 | 82 |

The present invention discloses a new class of polysubstituted anilino benzenes with high glass transition temperature which are particularly useful in organic EL devices. The molecular formula includes:

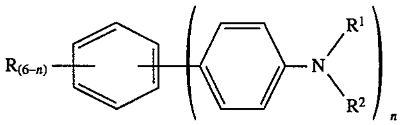

where $R^1$ and $R^2$ are either alkyl, aryl, or substituted aryl;

R is Hydrogen, alkyl, phenyl, or substituted phenyl;

n=3,4,5, or 6.

Illustrative examples of polysubstituted anilino benzenes possessing high Tg are the following:

| Compound | Molecular Structure | Tg(°C.) |
|---|---|---|
| 1 | 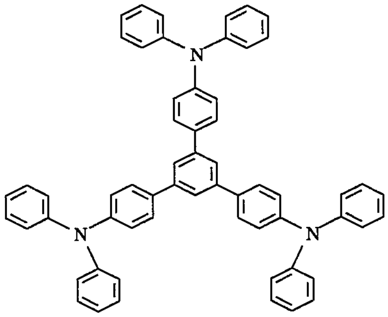 | 113 |

-continued
| Compound | Molecular Structure | Tg(°C.) |
|---|---|---|
| 2 | 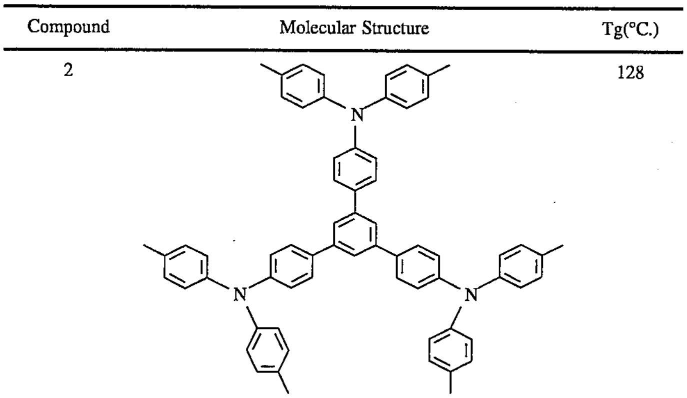 | 128 |
| 3 | 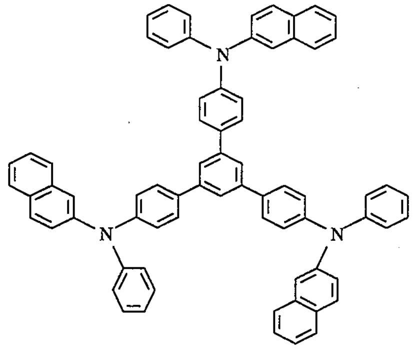 | 135 |
| 4 | 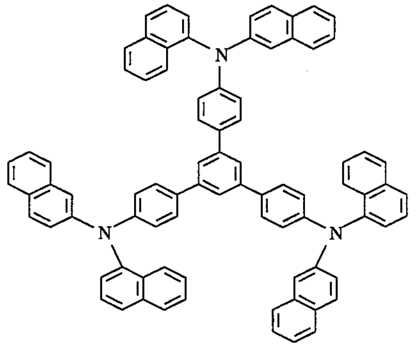 | 165 |
| 5 | 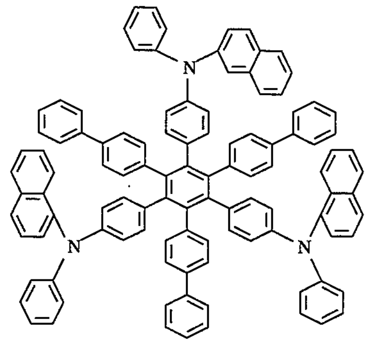 | |

-continued
| Compound | Molecular Structure | Tg(°C.) |
|---|---|---|
| 6 | 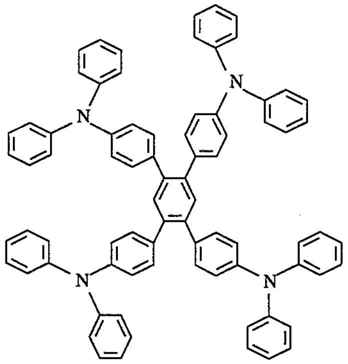 | |
| 7 | 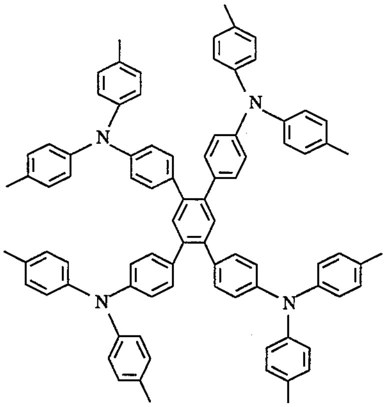 | |
| 8 | 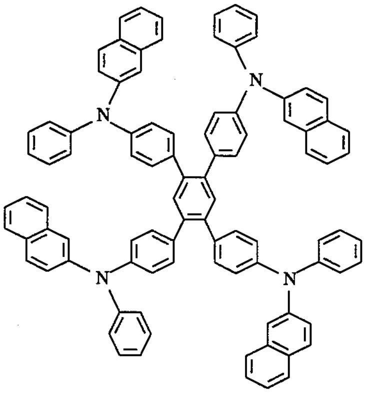 | |
| 9 | 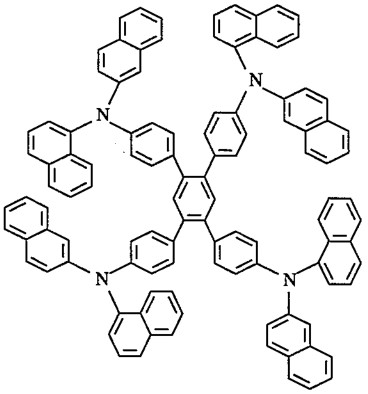 | |

-continued

| Compound | Molecular Structure | Tg(°C.) |
|---|---|---|
| 10 | 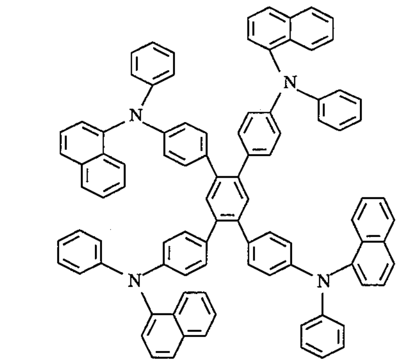 | |
| 11 | 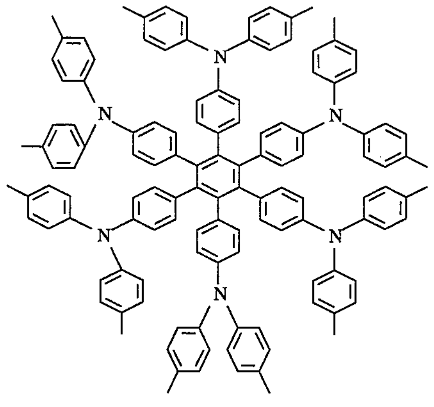 | |
| 12 | 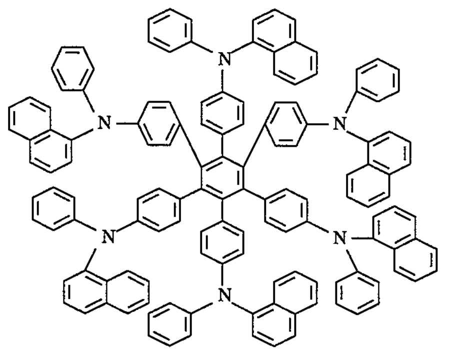 | |
| 13 | 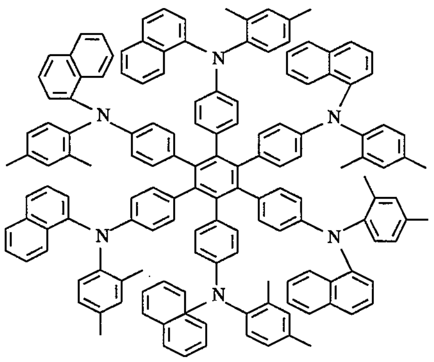 | |

Preferred thin film forming materials for use in forming the electron injecting and transporting layers of the organic EL devices of this invention are metal chelated oxinoid compounds, including chelates of oxine itself (also commonly referred to as 8-quinolinol or 8-hydroxyquinoline). Such compounds exhibit both high levels of performance and are readily fabricated in the form of thin films. Exemplary of contemplated oxinoid compounds are those satisfying structural formula (VII).

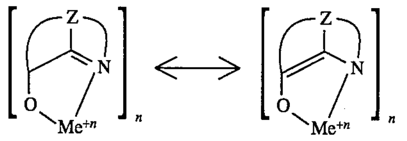

(VII)

wherein

Me represents a metal;

n is an integer of from 1 to 3; and

Z independently in each occurrence represents the atoms completing a nucleus having at least two fused aromatic rings.

From the foregoing it is apparent that the metal can be monovalent, divalent, or trivalent metal. The metal can, for example, be an alkali metal, such as lithium, sodium, or potassium; an alkaline earth metal, such as magnesium or calcium; or an earth metal, such as boron or aluminum. Generally any monovalent, divalent, or trivalent metal known to be a useful chelating metal can be employed.

Z completes a heterocyclic nucleus containing at least two fused aromatic rings, at least one of which is an azole or azine ring. Additional rings, including both aliphatic and aromatic rings, can be fused with the two required rings, if required. To avoid adding molecular bulk without improving on function the number of ring atoms is preferably maintained at 18 or less.

Illustrative of useful chelated oxinoid compounds are the following:

CO-1: Aluminum trisoxine [a.k.a, tris(8-quinolinolato)aluminum]

CO-2: Magnesium bisoxine [a.k.a. bis(8-quinolinolato) magnesium]

CO-3: Bis[benzo{f}-8-quinolinolato]zinc

CO-4: Bis(2-methyl-8-quinolinolato)aluminum(III)-μ-oxo-bis(2-methyl-8-quinolinolato) aluminum(III)

CO-5: Indium trisoxine [a.k.a., tris(8-quinolinolato)indium]

CO-6: Aluminum tris(5-methyloxine) [a.k.a. tris(5-methyl-8-quinolinolato) aluminum CO-7: Lithum oxine (a.k.a., 8-quinolinolato lithium)

CO-8: Gallium tris(5-chlorooxine) [a.k.a., tris(5-chloro-8-quinolinolato) gallium]

CO-9: Calcium bis(5-chlorooxine) [a.k.a., bis(5-chloro-8-quinolinolato) calcium]

CO-10: Poly[zinc (II)-bis(8-hydroxy-5-quinolinyl) methane]

CO-11: Dilithium epindolidione

CO-12: Bis(2-methyl-8-quinolinolato)(para-phenylphenylato)aluminum(III)

In the organic EL devices of the invention, it is possible to maintain a current density compatible with efficient light emission while employing a relatively low voltage across the electrodes by limiting the total thickness of the organic luminescent medium to less than 1 mm(10,000 Angstroms). At a thickness of less than 1 mm an applied voltage of 20 volts results in a field potential of greater than $2\times10^5$ volts/cm, which is compatible with efficient light emission. An order of magnitude reduction (to 0.1 mm or 100 Angstroms) in thickness of the organic luminescent medium, allowing further reductions in applied voltage and/or increase in the field potential and hence current density, are well within device construction capabilities.

One function which the organic luminescent medium performs is to provide a dielectric barrier to prevent shorting of the electrodes on electrical biasing of the EL device. Even a single pin hole extending through the organic luminescent medium will allow shorting to occur. Unlike conventional EL devices employing a single highly crystalline luminescent material, such as anthracene, for example, the EL devices of this invention are capable of fabrication at very low overall organic luminescent medium thicknesses without shorting. One reason is that the presence of three superimposed layers greatly reduces the chance of pin holes in the layers being aligned to provide a continuous conduction path between the electrodes. This in itself permits one or even two of the layers of the organic luminescent medium to be formed of materials which are not ideally suited for film formation on coating while still achieving acceptable EL device performance and reliability.

The preferred materials for forming the organic luminescent medium are each capable of fabrication in the form of a thin film—that is, capable of being fabricated as a continuous layer having a thickness of less than 0.5 mm or 5000 Angstroms.

When one or more of the layers of the organic luminescent medium are solvent coated, a film forming polymeric binder can be conveniently codeposited with the active material to assure a continuous layer free of structural defects, such as pin holes. If employed, a binder must, of course, itself exhibit a high dielectric strength, preferably at least about $2\times10^6$ volt/cm. Suitable polymers can be chosen from a wide variety of known solvent cast addition and condensation polymers. Illustrative of suitable condensation polymers are polyesters, polycarbonates, polyimides, and polysulfones. To avoid unnecessary dilution of the active material, binders are preferably limited to less than 50 percent by weight, based on the total weight of the material forming the layer.

The preferred active materials forming the organic luminescent medium are each film forming materials and capable of vacuum vapor deposition. Extremely thin defect free continuous layers can be formed by vacuum vapor deposition. Specifically, individual layer thicknesses as low as about 50 Angstroms can be present while still realizing satisfactory EL device performance. Employing a vacuum vapor deposited porphorinic compound as a hole injecting layer, a film forming aromatic tertiary amine as a hole transporting layer (which can in turn be comprised of a triarylamine layer and a tetraaryldiamine layer), and a chelated oxinoid compound as an electron injecting and transporting layer, individual layer thicknesses in the range of from about 50 to 5000 Angstroms are contemplated, with layer thicknesses in the range of from 100 to 2000 Angstroms being preferred. It is generally preferred that the overall thickness of the organic luminescent medium be at least about 1000 Angstroms.

The anode and cathode of the organic EL device can each take any convenient conventional form. Where it is intended to transmit light from the organic EL device through the anode, this can be conveniently achieved by coating a thin conductive layer onto a light transmissive substrate—e.g., a transparent or substantially transparent glass plate or plastic film. In one form the organic EL devices of this invention can follow the historical practice of including a light transmissive anode formed of tin oxide or indium tin oxide coated on a glass plate, as disclosed by Gurnee et al U.S. Pat. No. 3,172,862, Gurnee U.S. Pat. No. 3,173,050, Dresner "Double Injection Electroluminescence in Anthracene", *RCA Review*, Volume 30, pages 322–334, 1969; and Dresner U.S. Pat. No. 3,710,167 cited above. While any light transmissive polymeric film can be employed as a substrate, Gillson U.S. Pat. No. 2,733,367 and Swindells U.S. Pat. No. 2,941,104 disclose polymeric films specifically selected for this purpose.

As employed herein the term "light transmissive" means simply that the layer or element under discussion transmits greater than 50 percent of the light of at least one wavelength it receives and preferably over at least a 100 nm interval. Since both specular (unscattered) and diffused (scattered) emitted light are desirable device outputs, both translucent and transparent or substantially transparent materials are useful. In most instances the light transmissive layers or elements of the organic EL device are also colorless or of neutral optical density—that is, exhibiting no markedly higher absorption of light in one wavelength range as compared to another. However, it is, of course, recognized that the light transmissive electrode supports or separate superimposed films or elements can be tailored in their light absorption properties to act as emission trimming filters, if desired. Such an electrode construction is disclosed, for example, by Fleming U.S. Pat. No. 4,035,686. The light transmissive conductive layers of the electrodes, where fabricated of thicknesses approximating the wavelengths or multiples of the light wavelengths received can act as interference filters.

Contrary to historical practice, in one preferred form the organic EL devices of this invention emit light through the cathode rather than the anode. This relieves the anode of any requirement that it be light transmissive, and it is, in fact, preferably opaque to light in this form of the invention. Opaque anodes can be formed of any metal or combination of metals having a suitably high work function for anode construction. Preferred anode metals have a work function of greater than 4 electron volts (eV). Suitable anode metals can be chosen from among the high (>4 eV) work function metals listed below. An opaque anode can be formed of an opaque metal layer on a support or as a separate metal foil or sheet.

The organic EL devices of this invention can employ a cathode constructed of any metal, including any high or low work function metal, heretofore taught to be useful for this purpose. Unexpected fabrication, performance, and stability advantages have been realized by forming the cathode of a combination of a low work function metal and at least one other metal. For further disclosure, see U.S. Pat. No. 4,885,211 by Tang and Van Slyke, the disclosure of which is incorporated by reference herein.

EXAMPLES

The invention and its advantages are further illustrated by the specific examples which follow. The term "Tg" means glass transition temperature in degree centigrade as measured by thermal graphic analysis using a commercial instrument, Model 912 DSC, made by TA Instruments.

Synthesis

The general methods for the preparation of the high Tg polysubstituted anilino benzenes are as follows:

A:

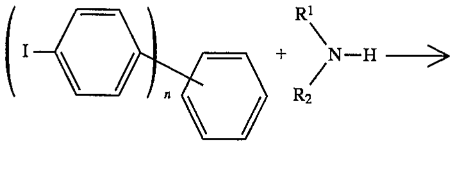

-continued

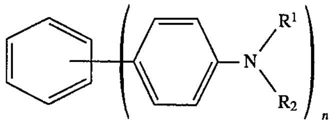

B:

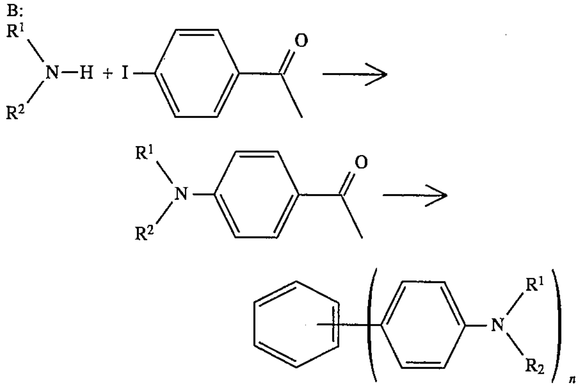

C:

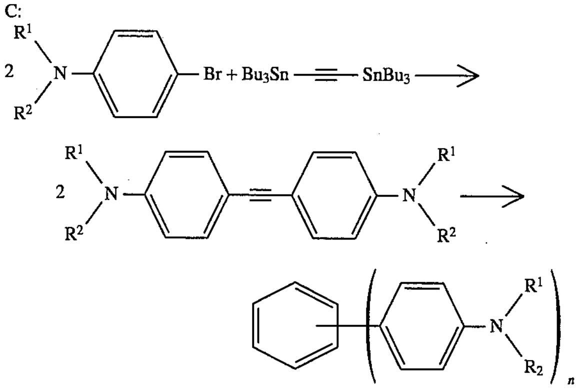

Example 1

Synthesis of 1,3,5-Tris-4-(Diphenylamino)Phenyl Benzene

Compound 1

Silicon (IV) chloride (0.58 ml, 0.85 g, 0.005 mol) was added slowly by syringe to a stirred suspension of 4'-diphenylaminoacetophenone (1.43 g, 0.005 mol) in 20 ml of dry ethanol at room temperature. The mixture was stirred for overnight at room temperature followed by heating to reflux for one hour. The reaction mixture was poured into water and resulting precipitate was filtered. The crude condensation product was chromatographed on silica gel using 1:1 hexane/dichloromethane as an eluant to give pure 1,3,5-tris-4-(diphenylamino)phenyl benzene (160 mg) in 12% yield.

Example 2

Synthesis of 1,3,5-Tris-4-(di-p-tolylamino)Phenyl Benzene

Compound 2

Silicon (IV) chloride (12.0 ml, 17.0 g, 0.10 mol) was added slowly by syringe to a stirred suspension of 4'-di-p-tolylaminoacetophenone (16.0 g, 0.05 mol) in 50 ml of dry ethanol at room temperature. The mixture was stirred for one hour at room temperature followed by heating to reflux for overnight. The reaction mixture was poured into water and resulting precipitate was filtered. The crude condensation product was chromatographed on silica gel using 1:1 hexane/dichloromethane as an eluant to give the pure 1,3,5-tris-4-(di-p-tolylamino) phenyl benzene (6.5 g) in 44% yield.

Example 3

Synthesis of 1,3,5-Tris-[4-(N-Phenyl)(N-2-Naphthalenyl)]Aminophenyl Benzene
Compound 3

4'-[N-(2-naphthalenyl)-N-(4-acetophenyl)]aniline (3.0 g, 0.0089 mol) in 50 ml of dry ethanol was refluxed until became completely solution. To this solution silicon (IV) chloride (10.0 ml, 14.8.0 g, 0.087 mol) was added slowly by syringe at room temperature. The solution immediately become the deep green. The mixture was stirred for one hour at room temperature followed by heating to reflux for overnight. The large amount of solid was precipitated from the reaction mixture and the color of the reaction solution become much pale. The reaction mixture was cooled to room temperature and 100 ml of water was added and the resulting precipitate was filtered. The crude condensation product was dried over the oven and then was added to 100 ml of dichloromethane. After stirring for half hour the precipitate was filtered off and washed with about 100 ml of dichloromethane. The organic solution was collected and the solvent was removed. The residue was chromatographed on silica gel using 4:1 p-513 ligroin/dichloromethane as an eluant to give the pure 1,3,5-tris-[4-(N-phenyl)(N-2-naphthalenyl)]aminophenyl benzene (1.86 g) in 65.5% yield.

Example 4

Synthesis of 1,3,5-Tris-[4-(N-1-Naphthalenyl)(N-2-Naphthalenyl)]Aminopbenyl-Benzene
Compound 4

Silicon (IV) chloride (2.5 ml, 3.7 g, 0.022 mol) was added slowly by syringe to a stirred suspension of 4'-[N-(1-naphthalenyl)-N-(2-naphthalenyl)]aminoaceto phenone (1.94 g, 0.005 mol) in 10 ml of dry ethanol at room temperature. The mixture was immediately become deep green solution. The reaction solution was heated to reflux for three hours under nitrogen. The reaction mixture was cooled to room temperature and added another 1.0 ml of silicon chloride. The reaction mixture was heated to reflux for another one hour. The solvent was removed and the residue was dissolved in dichloromethane and washed with water. After removal of solvent the crude condensation product was chromatographed on silica gel using 2:1 hexane/dichloromethane as an eluant to give pure 1,3,5-tris-[4-(N-1-naphthalenyl)(N-2-naphthalenyl)] aminophenyl benzene (0.98 mg) in 53.1% yield.

Example 5

Synthesis of Bis[4-(Di-P-Tolylamino)Phenyl]Acetylene

A mixture of 5.02 g (14.3 mmol) of 4-bromo-N,N-(di-p-tolyl)aniline, 4.6 g (7.6 mmol) of bis(tri-n-butylstannyl)acetylene and 360 mg (4% mol) of tetrakis(triphenylphosphino)-palladium in 40 mL of dry THF was refluxed under nitrogen for 24 hour. The solvent was removed under vacuum and 100 mL of NaOH (1M) was added and the mixture was sonicated for 20 min. The precipitated red solid was filtered and washed with water and dried. The crude product was triturated with ethyl acetate giving 2.6 g (64%) of product which was suitable for subsequent reaction. An analytical sample can be obtained by recrystalizing with butyronitrile: Anal. for $C_{42}H_{36}N_2$: Calcd: C, 88.69; H, 6.38; N, 4.93. Found: C, 87.84; H, 5.40; N, 5.06.

Example 6

Synthesis of Hexa[4-(Di-P-Tolylamino)Phenyl]Benzene
Compound 11

A mixture of 2 g (3.52 mmol) of the above acetylene compound and 200 mg of dicobolt octacarbonyl in 40 mL of dry THF was refluxed under nitrogen for 48 hours. After removing the solvent, the residue was flash chromatographed over a ¾"×5" silica gel (32–63 micron) column and eluted with Hexanes/methylene chloride (3/1) to give 1.78 g of slightly tannish brown solid. The product was further purified by soxlet extraction with hexanes to remove the color. The residue remained in the thimble was the pure colorless product weighing 1.3 g (65% yield). Anal. Calcd. for $C_{126}H_{108}N_6$: C, 88.69; H, 6.38; N, 4.93. Found: C, 88.28; H, 6.49; N, 4.83. $^1$H-NMR ($CDCl_3$): d2.27 (s), 6.70 (s), 6.89 (d,J=8.2 Hz), 7.0 (d,J=8.1 Hz); $^{13}$C-NMR ($CDCl_3$): d20.74, 121.96, 123.95, 129.76, 131,62, 132.39, 135.16, 140.11, 145.29, 145.60 ppm.

EL DEVICE FABRICATION AND PERFORMANCE

Example 7

Electroluminescent Device with High Tg Hole Transporting Layer

An electroluminescent device satisfying the requirements of the invention was constructed in the following manner:

a) An indium-tin-oxide coated glass substrate was sequentially ultrasonicated in a commercial detergent, rinsed in deionized water, degreased in toluene vapor and exposed to ultraviolet light and ozone for a few minutes.

b) A hole injecting layer of copper phthalocyanine (150 Angstroms) was then deposited on top of the ITO coated substrate by evaporation from a tantalum boat.

c) Onto the CuPc layer was deposited a hole transporting layer of 1,3,5-tris-4-(di-p-tolylamino)phenyl benzene, also evaporated from a tantalum boat.

d) An emitting layer of tris(8-quinolinolate) aluminum (III) (600 Angstroms) was then deposited onto the hole transporting layer. This material was also evaporated from a tantalum boat.

e) On top of the $AlQ_3$ layer was deposited a 2000 cathode formed of a 10:1 atomic ratio of Mg and Ag.

The electroluminescent cell thus formed was stability tested with a constant current of 20 mA/cm$^2$. The initial radiance exitance was 0.72 mW/cm$^2$, a level which is well in excess of that required for display applications. The cell intensity degrades slowly, with a 50% reduction after 250 hours of continuous operation. This demonstrates a sustained high level of light output.

Example 8

Further Example of Electroluminescent Device with High Tg Hole Transporting Layer An EL cell was constructed identically to that of example 1, except the hole transporting layer was 1,3,5-tris-[4-(N-1-naphthlenyl)(N-2-naphthlenyl)aminophenyl benzene (600 Angstroms). The device thus formed was operated under the same condition as the device of Example 1 and showed an initial radiance exitance of 0.62 mW/cm$^2$, which degraded to half this level after about 200 hours of operation. This example also demonstrates a sustained high level of light output.

The invention has been described in detail with particular reference to certain preferred embodiments thereof, but it will be understood that variations and modifications can be effected within the spirit and scope of the invention.

PARTS LIST

100 EL Device
102 Anode
104 Cathode
106 Organic luminescent medium
108 Superimposed layer
110 Superimposed layer
112 Superimposed layer
114 External power source
116 Conductor
118 Conductor
120 Lower organic layer
122 Upper organic layer
124 Holes
126 Electrons
128 Edges
200 Electroluminescent device
202 Transparent insulative support
204 Anode
206 Organic luminescent medium
208 Layer
210 Layer
212 Layer
214 Cathode
300 Electroluminescent device
302 Anode
306 Organic luminescent medium
308 Layer
310 Layer
312 Layer
314 Cathode

What is claimed is:

1. An organic electroluminescent device, comprising an anode and a cathode, and an organic electroluminescent element disposed between the anode and cathode, characterized in that the organic electroluminescent element has at least one hole transporting layer;

the hole transport layer includes a polyaromatic amine of the formula:

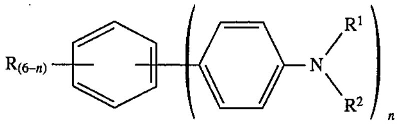

where n is equal to 4, 5, or 6;

$R^1$ is selected from the group consisting of alkyl, aryl and substituted aryl;

$R^2$ is selected from the group consisting of alkyl, aryl and substituted aryl; and R is selected from the group consisting of hydrogen and alkyl.

2. An organic electroluminescent device according to claim 1 n which $R^1$ and $R^2$ are phenyl.

3. An organic electroluminescent device according to claim 1 n which $R^1$ is phenyl and $R^2$ is naphthyl.

4. An organic electroluminescent device according to claim 1 n which $R^1$ and $R^2$ are naphthyl.

5. An organic electroluminescent device according to claim 1 n which n=6, $R^1$ and $R^2$ are phenyl.

* * * * *